United States Patent [19]

Beatty et al.

[11] 4,016,304

[45] Apr. 5, 1977

[54] METHOD FOR APPLYING PYROLYTIC CARBON COATINGS TO SMALL PARTICLES

[75] Inventors: Ronald L. Beatty, Oak Ridge; Dale V. Kiplinger, Concord; Bill R. Chilcoat, Knoxville, all of Tenn.

[73] Assignee: The United States of America as represented by the United States Energy Research and Development Administration, Washington, D.C.

[22] Filed: June 17, 1975

[21] Appl. No.: 587,004

Related U.S. Application Data

[63] Continuation of Ser. No. 848,078, Aug. 6, 1969.

[52] U.S. Cl. .................................. 427/6; 427/213
[51] Int. Cl.² ........................................ G21C 3/06
[58] Field of Search ................. 427/6, 213; 264/.5, 264/29; 176/91 SP

[56] References Cited

UNITED STATES PATENTS

| | | | |
|---|---|---|---|
| 3,247,008 | 4/1966 | Finicle | 427/6 |
| 3,284,549 | 11/1966 | Ford et al. | 427/6 |
| 3,382,093 | 5/1968 | Nack | 427/213 |
| 3,422,167 | 1/1969 | Bowman et al. | 264/.5 |

*Primary Examiner*—Ronald H. Smith
*Assistant Examiner*—S. Silverberg
*Attorney, Agent, or Firm*—Dean E. Carlson; David S. Zachry; Irving Barrack

[57] ABSTRACT

A method for coating small diameter, low density particles with pyrolytic carbon is provided by fluidizing a bed of particles wherein at least 50 per cent of the particles have a density and diameter of at least two times the remainder of the particles and thereafter recovering the small diameter and coated particles.

3 Claims, No Drawings

METHOD FOR APPLYING PYROLYTIC CARBON COATINGS TO SMALL PARTICLES

This is a continuation of application Ser. No. 848,078, filed Aug. 6, 1969.

BACKGROUND OF THE INVENTION

Fluidized bed coating methods have heretofore been widely investigated for depositing various coatings onto numerous core particles. In the nuclear reactor field these coaters have been utilized to deposit such coatings as pyrolytic carbon onto the various nuclear fuel particles; viz, oxides, carbides, and nitrides of the actinide metals thorium, uranium, and plutonium. Similarly, compounds to the Group IV metals, such as titanium, zirconium, and hafnium, have been successfully coated with pyrolytic carbon for various applications.

Nuclear fuel particles typically have a density in the range 8 to 11 g/cc and a diameter 200 to 600 microns. These particles are sufficiently large and have densities such that during coating they remain as separate distinct particles. For gas-cooled reactors, such as Ft. St. Vrain HTGR one fuel concept comprised a pyrolytically coated, low density, small diameter $UC_2$ + fuel particle. Attempts to coat these small, low density particles have received little success using known prior art coating techniques. Apparently, when the hydrocarbon coating gas begins to decompose, the fluidizing particles and the wall of the coater become "tacky" such that the individual particles stick together and to the vessel walls.

Summary of the Invention

The object of this invention, which is to provide a method for coating small, low density particles with pyrolytic carbon, is achieved by fluidizing a bed of particles wherein at least 50 volume percent of the particles have a density and diameter of at least two times that of the small, low density particles and thereafter separately recovering the small, low density pyrolytically coated particles. Small, low density particles having diameters in the range of 40 to 150 microns and densities in the range of 1.0 to 3.0 g/cc have been successfully coated with pyrolytic carbon (~ 25 microns) by mixing therewith greater than 50 volume percent 400 micron size particles and coating with methane gas at a temperature of 1400° C. The small, low density coated particles which were uniformly coated and spherical were readily separately recovered from the larger particles by sieving.

DESCRIPTION OF THE PREFERRED EMBODIMENTS

While the invention will be understood to be applicable to coating particulate materials in general it will be described with particular reference to coating microspheres, such as prepared by the sol-gel process. In carrying out the process the small, low density particles are mixed with larger denser particiclies in a conventional fluidized bed coater and the coater brought up to a deposition temperature while fluidizing with an inert gas such as helium. It is important to the successful practice of this invention that the volume percent of these large particles should be at least 50 percent. Moreover, the density and diameter of these larger particles should be at least two times that of the smaller particles. Inasmuch as segregation of the two types of particles will occur in the fluidized bed coater if the difference is too great, it is referred that the larger particles should be no greater than six times the smaller diameter particles.

It is theorized that the larger, more dense particles provide the necessary kinetic energy to prevent the small, low density particles from sticking to themselves and to the coating furnace wall.

The coating phase is initiated by substituting a suitable hydrocarbon gas for the inert fluidizing gas. Methane gas is quite suitable as the hydrocarbon gas in depositing a pyrolytic carbon coating. The hydrocarbon gas may be used either undiluted or as a mixture with an inert fluidizing gas. Where a mixture is employed helium is quite suitable as a diluent gas and ratios of 1 to 1 are effective. The supply rates for the coating gas are, preferably, between 0.5 and 1.0 $cm^3$/min.-$cm^2$.

The time and temperature parameters are not critical except that they should be chosen to effect an operable coating thickness of pyrolytic carbon. Temperatures of about 1400° C produce acceptable pyrolytic carbon coatings of thickness of about 25 microns with methane gas with a coating time of 90 minutes.

After the desired coating thickness is achieved the coating phase is terminated by shutting off the hydrocarbon gas flow and the coated particles permitted to cool to room termperature. Then the small diameter coated particles are separated from the larger particles by any convenient means, such as by sieving or screening.

Having described the invention in a general fashion the following examples are provided to indicate with greater particularity the process parameters and techniques of the present invention.

EXAMPLE I

The feasibility of coating small, low density spherical $UC_2$ 20 microspheres which were prepared hy reacting sol-gel derived $UO_2$-C microspheres at 1600° C for 16 hours, was demonstrated in a one-inch fluidized bed coater consisting of a two-piece vertical graphite tube which provided a coating or reaction zone one inch in diameter and approximately four inches high and a disentrainment chamber 1-¾ inches in diameter. The reaction chamber had a 36-degree included angle conical bottom with a 0.081-inch diameter gas-inlet orifice.

A 100-gram charge of these microspheres, which had a diameter of 100 microns and a density of 2.5 g/cc, was fluidized with 200 grams of carbon-coated $ThO_2$ microspheres having a diameter of 400 microns and a density of 5.0 g/cc. After bringing the fluidizing mixture to the deposition temperature of 1400° C, the microspheres were coated with pyrolytic carbon using methane at a supply rate of 1.0 $cm^3$/min.-$cm^2$.

Upon reaching a coating thickness of about 25 microns, the coating operation was terminated and the pyrolytic carbon coated microspheres allowed to cool to room temperature. The small, low density coated microspheres were then separated by sieving from the large diametar particles and examined. The coated particles were nicely coated and substantially spherical with a minimum number of doublets (two particles stuck together).

EXAMPLE II

A charge of sol-gel derived TiC microspheres hving a diameter of 50 microns and a density of 1.0 g/cc was mixed with 150 grams of carbon-coated $ThO_2$ microspheres 150 microns in diameter and fluidized with helium at 1400° C in the apparatus described in Example I.

The microspheres were then coated with pyrolytic carbon using methane at 1400° C and a supply rate of 0.5 cm³/min.-cm². After a coating thickness was achieved, the coating operation was terminated and the pyrolytic carbon coated TiC microspheres allowed to cool to room temperature. The resulting small, low density pyrolytic carbon coated TiC microspheres were then separated from the larger microspheres by screening. The pyrolytic carbon coated TiC microspheres were inspected and found to be nicely coated and spherical.

What is claimed is:

1. An improved pyrolytic carbon coating process which comprises fluidizing a mass of particles composed of an oxide, carbide, or nitride of a metal selected from the group consisting of thorium, uranium and plutonium or composed of a compound of a metal selected from the group consisting of titanium, zirconium and hafnium a minor proportion of which contains paticles having a density in the range 1-3 grams/cc and the balance consisting of particles which have a diameter two to six times larger than, and a density at least twice that of the particles in said minor proportion, depositing a pyrolytic carbon coating on said fluidized mass of particles and then separating the smaller, less dense coated particles from the larger, denser, coated particles.

2. The method of claim 1 wherein said fluidizing step is carried out with methane at a deposition temperature of about 1400° C.

3. The method of claim 2 wherein said methane is supplied at a rate of 0.5 to 1.0 cm³/min.-cm².

* * * * *